United States Patent [19]

Borgendale et al.

[11] Patent Number: 4,933,880
[45] Date of Patent: Jun. 12, 1990

[54] METHOD FOR DYNAMICALLY PROCESSING NON-TEXT COMPONENTS IN COMPOUND DOCUMENTS

[75] Inventors: Kenneth W. Borgendale; Michael D. Flannery, both of Rockville; Michael B. Geiger; Allen D. Ross, both of Germantown, all of Md.

[73] Assignee: International Business Machines Corp., Armonk, N.Y.

[21] Appl. No.: 206,788

[22] Filed: Jun. 15, 1988

[51] Int. Cl.$^5$ .............................................. G06F 3/03
[52] U.S. Cl. .................................. 364/523; 364/518; 364/900; 364/943; 364/943.1
[58] Field of Search ........ 364/518, 521, 900 MS File, 364/523

[56] References Cited

U.S. PATENT DOCUMENTS

3,930,237 12/1975 Villers .................................. 364/900
4,608,662 8/1986 Watanabe et al. .................. 364/900
4,723,209 2/1988 Hernandez et al. ............. 364/518 X

Primary Examiner—Gary V. Harkcom
Assistant Examiner—Mark K. Zimmerman
Attorney, Agent, or Firm—Jeffrey S. LaBaw

[57] ABSTRACT

A method of editing compound documents containing both text and non-text components, such as image, graphics or digital-audio objects. The method transforms a compound document in modified revisable form architecture to an internal editing format. In the transformation process, non-text components are recognized and catalogued in a component index generated for the compound document in the internal editing format. The component index contains information on the characteristics of the non-text components and describes the size, location and type of each non-text component. A reference or referencing control to the non-text component is placed in the text at the location the user wishes to print or display the non-text component in the final document. Through the invention, it is possible to represent and display a single non-text component multiple times within the compound document while storing only a single physical representation of the non-text component within the document. The method also provides a improved means of displaying the characteristics of the non-text component to the user, particularly where an alphanumeric display is used.

18 Claims, 13 Drawing Sheets

| OFFSET TO NEXT ENTRY |
|---|
| COMPONENT TYPE  (IMAGE/ GRAPHIC/ AUDIO/ OTHER) |
| COMPONENT NAME |
| INTERNAL STARTING PAGE NUMBER |
| PAGE COUNT |
| RESERVED FIELDS |

FIG. 8

HERE IS A PICTURE OF OUR SALES DIRECTOR MAKING A MARKETING CALL.

KEEP UP THE GOOD WORK.

*Albert J. Robinson*

FIG. 5

```
------------------------------------------------- PAGE 1 --------------
<RCR>                                                              ⸝—60
****** IMAGE LOGO ****************************************************
<RCR>
TO:   ALL MEMBERS OF THE SALES TEAM <CR>
<CR>
FROM: A. ROBINSON <CR>
<CR>
SUBJECT: WEEKLY MEMORANDUM <CR>
<CR>
DATE: MARCH 24, 1987 <RCR>
<CR>
CONGRATULATIONS TO ALL. THE FOURTH QUARTER SALES FIGURES FOR OUR <CR>
COMPANY SHOW REAL IMPROVEMENT OVER THE PREVIOUS QUARTERS. TAKE A <CR >
LOOK AT THE CHART BELOW TO SEE THE QUARTERLY FIGURES. <CR>
<SKP>
<RCR>                                                              ⸝60
****** GRAPHIC SALESPIE ***********************************************
<RPE>
<PE>
--------------------------------------------------------- PAGE 2 -------
IN FACT, SALES WERE SO GOOD THAT THE DEPARTMENT WAS MENTIONED IN <CR>
OUR COMPANY'S NEWSLETTER. I AM INCLUDING IT SO EVERYONE CAN SEE: <CR>
<RCR>                                                              ⸝60
****** IMAGE WORDS ****************************************************
<RCR>
THE SALES TEAM DESERVES MOST OF THE CREDIT FOR THE IMPROVEMENT. <CR>
TO CELEBRATE OUR SUCCESS, WE ARE GOING TO TAKE NEXT FRIDAY OFF TO <CR>
HAVE A PICNIC. PLEASE COME AND BRING A GUEST. <RCR>
<RPE>
<PE>
--------------------------------------------------------- PAGE 3 ------
HERE IS A PICTURE OF OUR SALES DIRECTOR MAKING A MARKETING CALL. <CR>
<RCR>                                                              ⸝60
****** IMAGE STAFF ****************************************************
<RCR>
KEEP UP THE GOOD WORK. <CR>
<RCR>                                                              ⸝60
****** IMAGE ARSIG ****************************************************
<RCR>
<PE>
```

FIG. 6

ANY COMPANY ENTERPRISES

TO: ALL MEMBERS OF THE SALES TEAM
FROM: A. ROBINSON
SUBJECT: WEEKLY MEMORANDUM
DATE: MARCH 24, 1987
CONGRATULATIONS TO ALL. THE FOURTH QUARTER SALES FIGURES FOR OUR COMPANY SHOW REAL IMPROVEMENT OVER THE PREVIOUS QUARTERS. TAKE A LOOK AT THE CHART BELOW TO SEE THE QUARTERLY FIGURES

REPORT ON SALES

FIG. 10

PRINTED TUESDAY MAY 24, 1988 12:33         PATENT VERIFY A1      PAGE

```
1  | <PFC>----------------------------------------------PAGE 1-----
2  | <TAB> THIS IS A MAP OF THE UNITED STATES PRINTED AT 5x5 INCHES. <RCR>
3  | <CR>
4  | ****** GRAPHIC AMERICA *******************************************
5  | <TAB> THIS IS A MAP OF THE UNITED STATES PRINTED AT 3x3 INCHES. <RCR>
6  | <CR>
7  | ****** GRAPHIC AMERICA *******************************************
8  | <TAB> THIS IS A MAP OF THE UNITED STATES PRINTED AT 1x1 INCHES. <RCR>
9  | <CR>
10 | ****** GRAPHIC AMERICA *******************************************
11 | <TAB> THIS IS A MAP OF THE UNITED STATES PRINTED AT 1/2x1/2 INCHES. <RCR>
12 | <CR>
13 | ****** GRAPHIC AMERICA *******************************************
14 | <PE>
```

FIG. 7

IN FACT, SALES WERE SO GOOD THAT THE DEPARTMENT WAS MENTIONED IN OUR COMPANY'S NEWSLETTER. I AM INCLUDING IT SO EVERYONE CAN SEE:

Any Company Earnings Up in 4th Quarter

WASHINGTON, February 20—John Doe, chief financial officer of Any Company, Enterprises said yesterday that increased sales led the company to increased profits in the fourth quarter.

In a meeting with analysts, Mr. Doe said, "Our sales have increased dramatically in the last two quarters. We are continuing to open new markets, both in America and abroad."

Mr. Doe continued "We believe that our sales will continue to improve this year."

The market took the report optimistically. Any Company was up 1¼ to 25½ at yesterday's close.

Hard Work Yields Easy Reference

THE SALES TEAM DESERVES MOST OF THE CREDIT FOR THE IMPROVEMENT. TO CELEBRATE OUR SUCCESS, WE ARE GOING TO TAKE NEXT FRIDAY OFF TO HAVE A PICNIC. PLEASE COME AND BRING A GUEST.

FIG. 9

THIS IS A MAP OF THE UNITED STATES PRINTED AT 5×5 INCHES

THIS IS A MAP OF THE UNITED STATES PRINTED AT 3×3 INCHES

THIS IS A MAP OF THE UNITED STATES PRINTED AT 1×1 INCHES

THIS IS A MAP OF THE UNITED STATES PRINTED AT ½ × ½ INCHES

METHOD FOR DYNAMICALLY PROCESSING NON-TEXT COMPONENTS IN COMPOUND DOCUMENTS

BACKGROUND OF THE INVENTION

1. Technical Field

This invention relates to compound document composition and processing and more particularly to methods for embedding within a document non-text objects.

2. Background Art

With the advent of modern computer technology, and in particular, with word and text processing applications, it is desirable to expand such application programs to allow the creation of compound documents. A compound document is defined as a document in which non-text objects such as an image, a graphic or an audio component are embedded in the textual data stream. In the prior art, the non-text objects have been represented in the document by an icon.

One problem encountered in the composition and management of compound documents is the great amount of computer memory and secondary storage required for viewing and storing these documents. Depending upon the resolution of the image and whether grey level or color is used, an image can require several million bytes of storage and a graphic representation such as a CAD drawing can require tens of thousands of bytes of storage.

Another problem encountered in the composition and management of compound documents is the ability to represent within the document on a display, particularly on a non image/graphic display, such as an alphanumeric display, the full contextual and visual placement of a non-text object within the text preceding and following it. Depending upon the capabilities of the given display, it is not always possible to visually display both text and non-text components concurrently.

There are several methods known in the prior art for storing such graphics or image/non-text objects. The most direct method is to directly store in the data stream the entire bit map or vector representation or audio representation that is to be incorporated in the document. In this method, any subsequent display of the same non-text object in the document requires that the entire non-text object be stored once again in the data stream. Since many documents will reference and display a figure more than once in the document, this method can become quite storage intensive.

Another method for non-text object storage stores the object in a compressed form, such as the CCITT standards of storage of certain image and graphic non-text objects and similar modes of compressing audio data. In this way, the compressed non-text object is stored in the data stream. To view the text and non-text document in their entirety, any such browsing system must have the requisite decoding or decompressing algorithms resident in on-line code, and the required high intensity computations must be performed as part of the browse operation. Although this method does reduce the amount of storage for multiple incorporations of the same non-text object, or for single non-text objects, it does lead to slow, compute intensive display and browse of a document. The ability to store a non-text object and reference it multiple times in a non-storage and non-computer intensive environment has not been accomplished by any of the prior art methods.

There are few methods known in the prior art for accurate representation of a non-text component on a non image/graphic capable display. One method would be to reserve "white space" in and around the text area of the document for later placement of the non-text component. White space is a reserved area on the screen into which no additional text or input could be placed. This white space would take up the same amount of space as the referenced non-text object requires within the document without displaying the non-text object directly. Documents which contain full page image/graphic objects would thus be represented as multiple pages of white space in the document. This method is generally not deemed user-friendly, since scrolling the document can result in encountering several pages of all white screens.

Another method for representing non-text components in a document is to place an icon or control within the data stream on one line within the document. Although this method significantly reduces the space used to represent the components in the document, it does not provide the user or controlling program the information necessary to understand how a particular component is to be placed within the remaining text of the document.

SUMMARY OF THE INVENTION

It is therefore an object of the invention to provide an improved means of creating compound documents which contain text and non-text components.

It is another object of the invention to minimize the amount of storage required for multiple inclusion of a single non-text object within a compound document.

It is yet another object of the invention to provide an improved and user-friendly means of presenting a non-text object within a compound document on an alphanumeric display.

It is still another object of the invention to minimize the storage and compute requirements for displaying non-text components.

These and other objects of the invention are accomplished by combining information about various image/graphic/audio or other non-text objects in a compound document, tying that information with the Dynamically Active Image/Graphic/Object Control Field (hereafter referencing or component control) and displaying that information to the user on a single line of text. This invention provides an improved method of storage and multiple referencing of a given non-text object as well as an improved means of locating non-text objects within a textual document without consuming space within the document for subsequent text entry. This is done by providing multiple referencing controls for a given non-text object within the document database while storing the given non-text object only in a single location within the document database. Reference is made to a component index by the data processing system to locate the non-text object within the document.

First, the compound document organized in an external Revisable Form Text/Document Content Architecture (RFT/DCA) data stream is transformed into an internal editing format in the random access memory in the data processing system. The transformation process recognizes the existence of non-text objects within the data stream and extracts information from the data stream about the objects to construct a component index. The component index typically would include the component name, its type, i.e., image/graphic/audio or some other type, an internal system page number containing a pointer/displacement to the first page of the non-text component data followed by a count of the number of sequential pages containing the non-text data, and reserved fields for any related information about the non-text object. This component index is initially created during the document transformation from external RFT/DCA format to internal format. It is kept current in the editing process by updating the index after the successful inclusion of a new image/graphic/audio component within the document data stream. The component index is also utilized when components are deleted from the document or renamed within the document.

The transformation process recognizes the existence of non-text objects or components within the data stream and places a referencing control (also called component control) on the line where the non-text component will be printed in the final document. This control is displayed to the user when a page of text containing non-text components is viewed. At the control, the user has several options open to him: (1) To hot-key to a screen that is capable of displaying the referenced component, (2) To display a menu associated with the component control which includes the control parameters listed for the non-text components, (3) To change the control parameters for the non-text components with or without displaying the menu containing the control parameters. When the third option is taken, the program controlling the page layout will have the information necessary to reflow the document as necessary based on the new control parameters.

Another embodiment of the invention envisions the use of component indexes within more than one document; where while editing a primary document, a second component index is utilized during a view of a second document which also contains non-text components. The same document transformation process is performed on the second viewable only document, thereby creating the second component index. The invention envisions combining a non-text component of the second, viewable only document into the primary editing document. After both component indexes are created, the source non-text component in the second document is defined by the user by selecting the component control associated with the source non-text component. Then a target location in the primary editing document is selected. A referencing control is placed in the primary document at the position where the non-text component from the second document will ultimately be printed in the final document. The invention refers to the second index table for the location of the non-text component in the second document database and extracts the non-text component to the first document database. Then an index entry is added to the first index component which describes the location, size, name, type, etc., of the non-text component in the primary document.

BRIEF DESCRIPTION OF THE FIGURES

The above and other objects, features, and advantages of the invention will be more fully appreciated with reference to the accompanying figures.

FIG. 15 is a flow diagram of the operation of printing a compound document containing both text, graphical components, and image components, such as is depicted in FIGS. 6, 7 and 8.

DESCRIPTION OF THE BEST MODE FOR CARRYING OUT THE INVENTION

The invention can be utilized in the distributed data processing system described in U.S. Pat. No. 4,731,735 entitled "Multi-Lingual Processing for Screen Image Build and Command Decode in a Word Processor, With Full Command, Message and Help Support," by K. W. Borgendale, et al., which is incorporated herein by reference. The invention disclosed herein can also be implemented in the stand-alone processor such as a personal computer.

Figure 1:
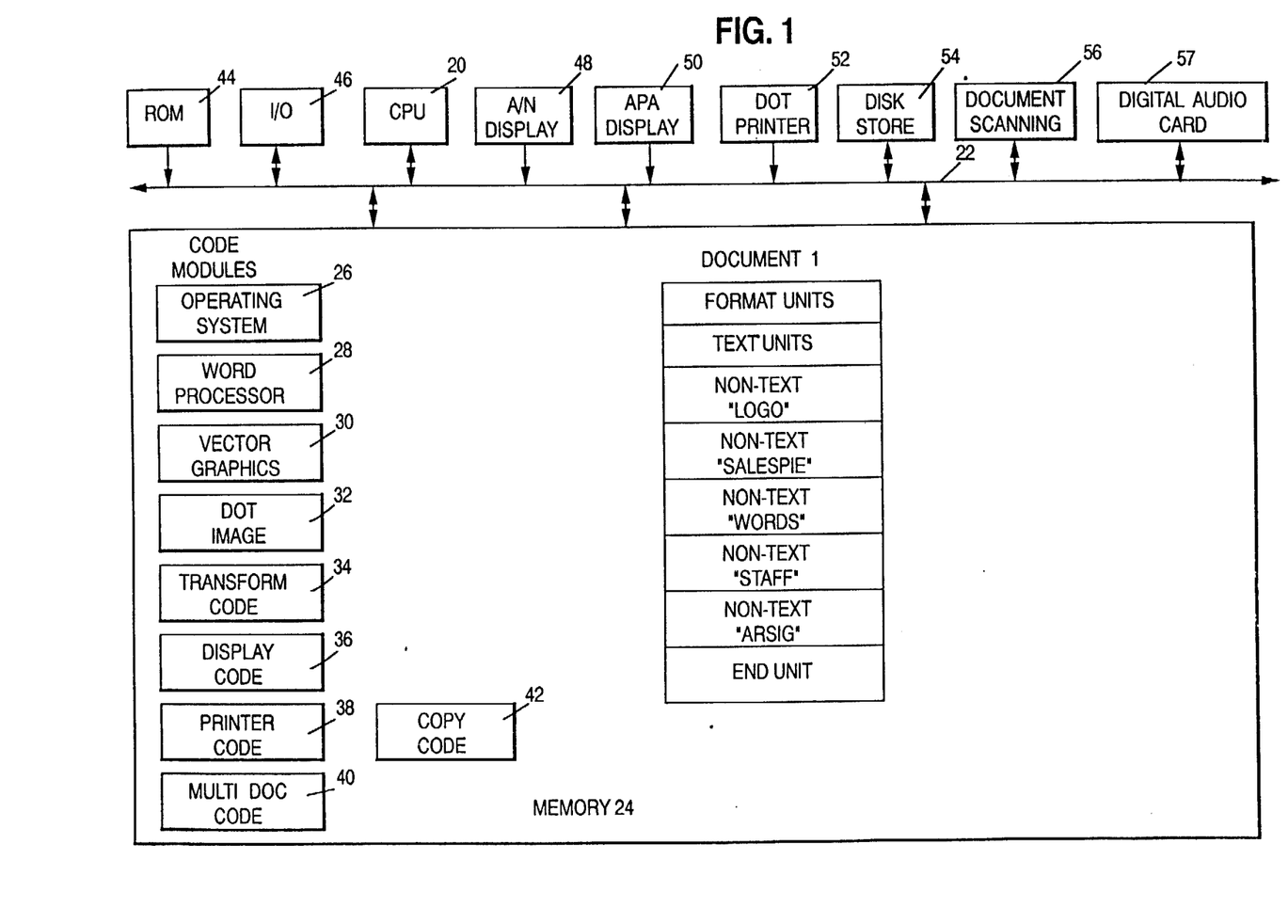
FIG. 1 is an architectural block diagram of a data processor, depicting the memory having read therein a first document.

The preferred embodiment of the invention comprises a set of programs for controlling a text processing system as shown. The architectural block diagram in FIG. 1 which includes a CPU 20 connected by means of a system bus 22 to a random access memory 24. The random access memory 24 stores the set of program instructions in the form of code modules, to perform operating system functions in the module 26, word processor functions in the module 28, vector graphics functions in the module 30, dot image functions in the module 32, transform code functions in the module 34, display code functions in the module 36, printer code functions in the module 38, multi-document management code functions in the module 40, and document component copying functions in the copy-code module 42. Also included in the data processing system of FIG. 1, is a read-only memory 44, which contains fixed instructions which are executable by the CPU 20 to carry out elementary operations for the processor. The I/O 46, can be connected to communication lines or other I/O equipment for communication by the processor, with external equipment.

An alphanumeric (A/N) display 48 can display text, for example, on a screen of 80 columns wide by 25 lines high, a page of alphanumeric text can be displayed with approximately 2,000 alphanumeric characters. An alphanumeric display, however, is not capable of displaying individual pels of visual information. Therefore, images formed from an array of dots or graphical representations formed from a vector graphics data set, cannot be displayed on an alphanumeric display.

Also included in the data processor of FIG. 1 is an all-points addressable display (APA) 50, which is capable of displaying each individual pel in a dot-image or a vector graphics image, as well as an alphanumeric text. Still further, a dot-matrix printer 52 is connected in the data processor of FIG. 1, which is capable of printing out each individual pel of a dot-image or a vector-graphics image. The disk storage 54 in the data processor of FIG. 1 stores files of the documents such as Document 1, depicted in FIG. 1. Document scanner 56 provides the preferred means of inputting image data into the text processing system to provide an image non-text component, and a digital-audio card can input the data for a digital audio non-text component. Image, graphic, and digital audio non-text components are the primary non-text components contemplated by the preferred embodiment, although other types of non-text components are possible.

Document 1 in FIG. 1 is generally organized to include a format unit, text units, non-text units and an end unit. Document 1 is in a modified revisable form (RFT/DCA) architecture. In accordance with the invention, non-text components such as image data units and vector graphics data units can be included in Document 1. In FIG. 1, the non-text "logo" image, the non-text "salespie" graphic, the non-text "words" image, the non-text "staff" image, and the non-text "arsig" image are included in Document 1. Document 1 can be read in as a single reading operation into the memory 24, or in an alternate embodiment, Document 1 can have its various units sequentially read-in and can be operated upon. In either embodiment, Document 1 will be operated upon by the transform code 34 which is depicted in the flow diagram of FIG. 2, to generate Index 1, as is shown in FIG. 3. An index such as Index 1 includes one or more index entries. An index entry format is shown in FIG. 4.

Figure 2A:
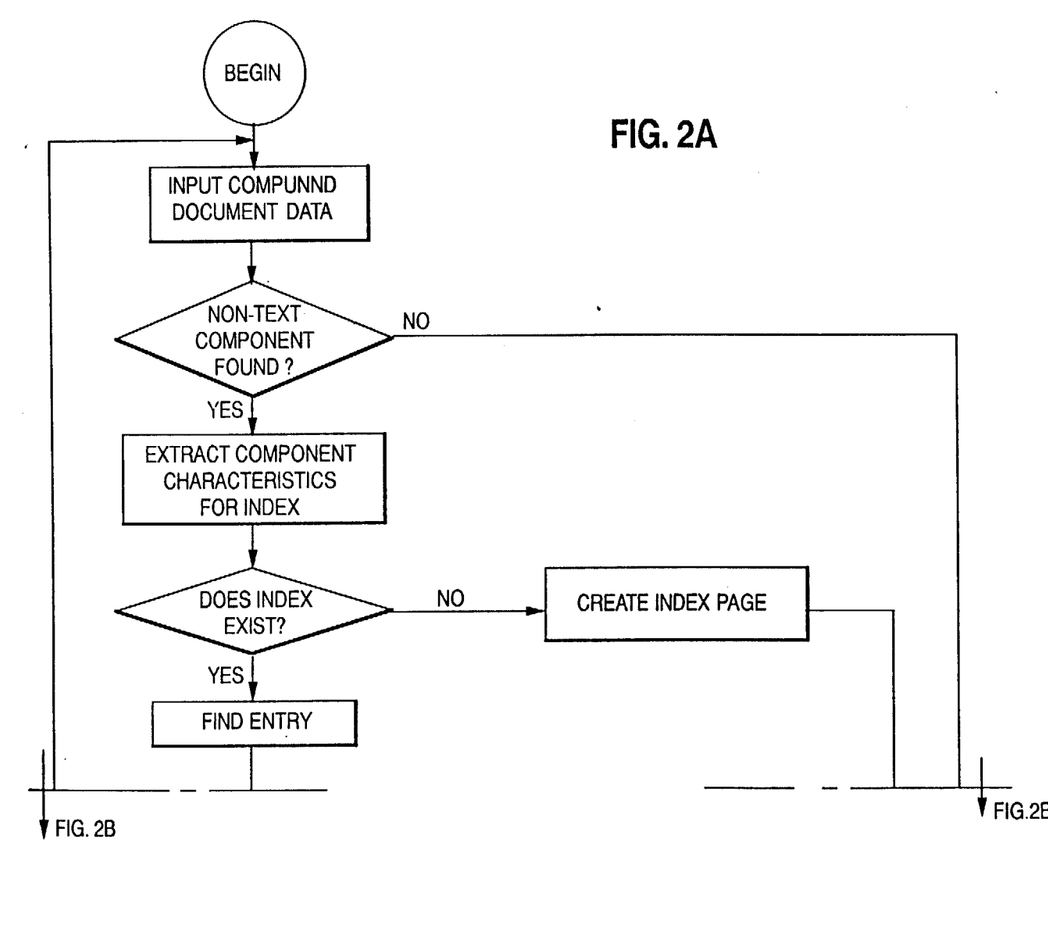
FIG. 2 is a flow diagram of the process for transforming a document data stream into the document as seen in FIG. 3 and the index table, also as seen in FIG. 3.
Figure 2B:
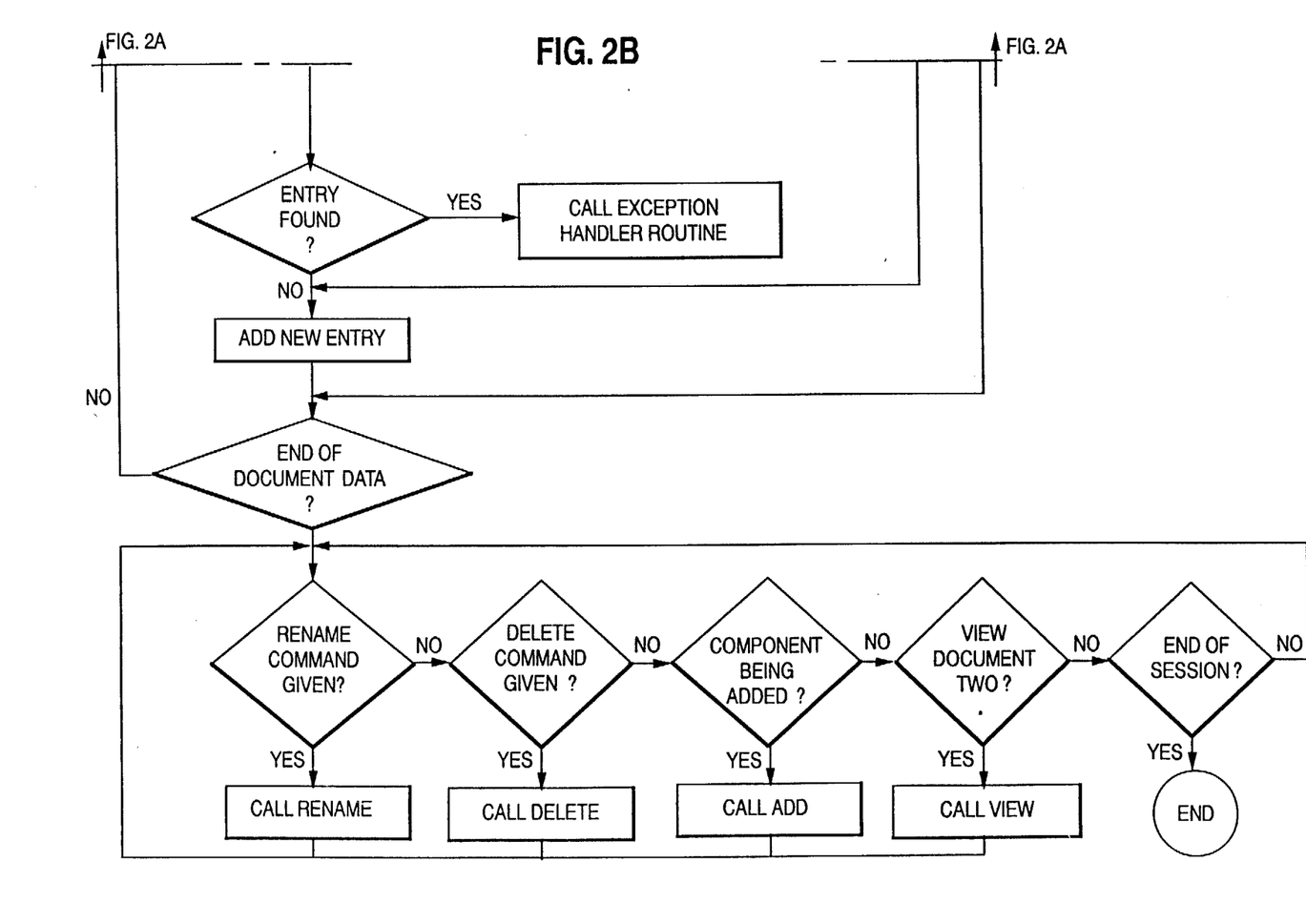
Figure 3:
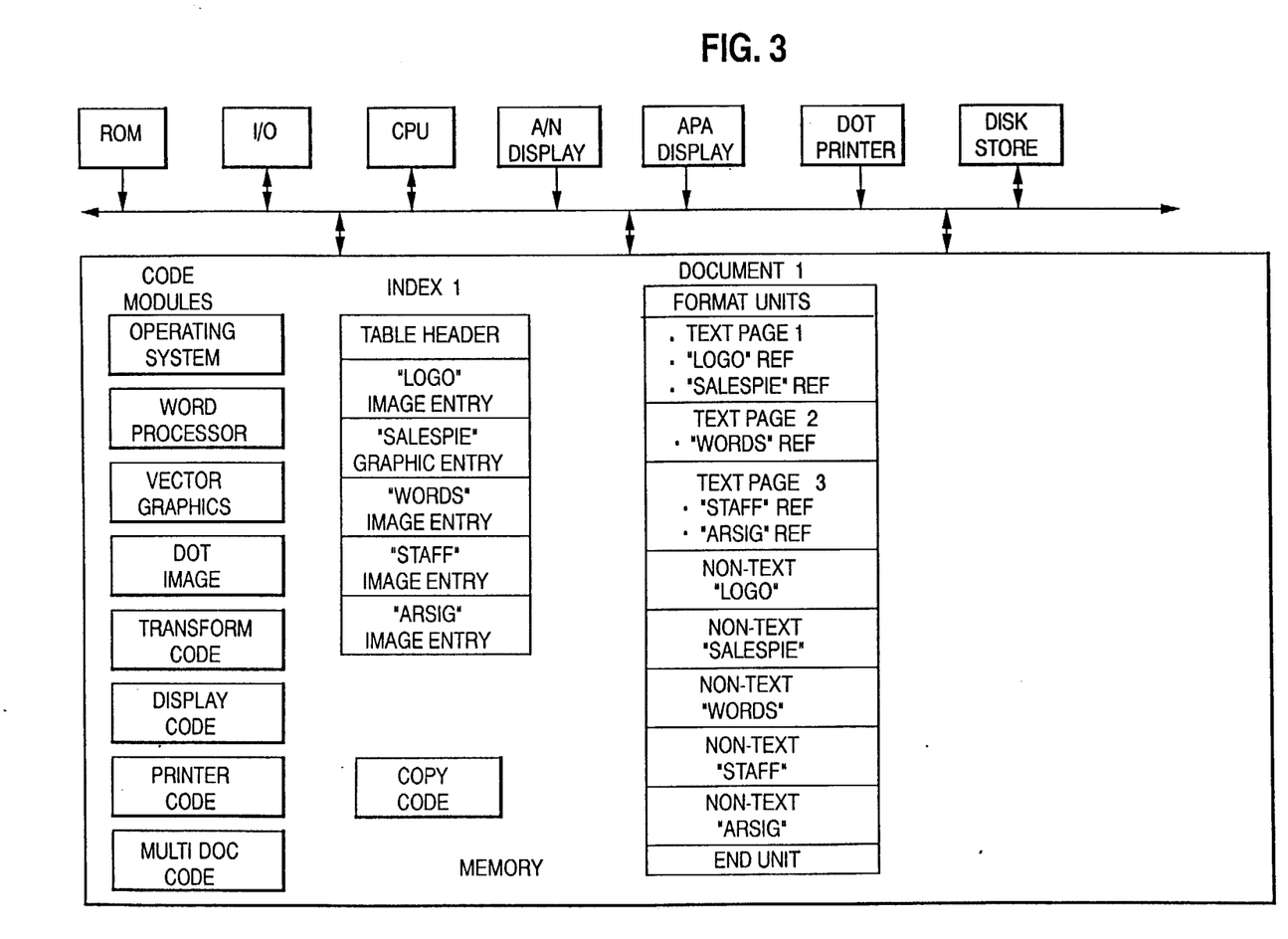
FIG. 3 is an architectural block diagram of the data processor shown in FIG. 1, which depicts the format for the document and the arrangement of the index table after having been produced by the flow diagram of FIG. 2.

As Document 1 is operated upon by the transform code 34 of FIG. 2, the transform code 34 checks to see if a non-text component is present, such as the "logo" component. If such a component is present, its characteristics are extracted from the revisable form Document 1 for component index, Index 1, shown in FIG. 3. The transform code 34 determines whether the Index 1 already exists, if not, it begins constructing Index 1 for Document 1. When the Index 1 is constructed, a table header is constructed and then the data necessary for the image entry for "logo," is then entered. The transform code 34 adds the new data for "logo" to the component index to an already existing index entry for "logo" in Index 1, or if none is existing, as would be the case when Index 1 is being constructed, the transform code 34 adds a new index entry ("logo") for the non-text component. Reference to FIG. 3 will illustrate that the component index, Index 1, commences with a table header, followed by the "logo" image index entry. In FIG. 2, the program then inquires as to whether there are additional non-text components to add to Index 1. If there are additional non-text components, it repeats the procedure outlined above for building Index 1. The program flow of FIG. 2 then reviews Document 1 to identify the rest of the non-text components, namely "salespie," "words," "staff," "arsig." These five non-text components are entered into the Index 1, as is shown in FIG. 3.

Figure 4:
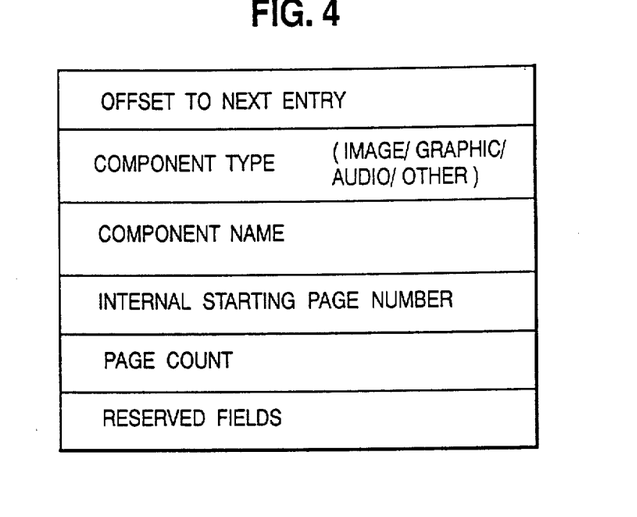
FIG. 4 illustrates the layout of a single entry into the index for an image or a graphic component.

Reference to FIG. 4 shows the layout of a single index entry in the component index for Index 1. FIG. 4 illustrates that there are several fields present for each entry. An offset refers to the next index entry in the component index. A component-type field designates whether the component is image information, vector graphic information or other type of information such as digital-audio information. The next field will name the component; for Document 1, the first non-text component is "logo," which would be used as the component name on that index entry. The next field provides the internal starting page number, i.e., where the "logo" image is stored within the data stream of Document 1. The next field provides a page count, which is the number of internal 12 K byte pages, which the image entry will occupy. Additional fields can be provided for other characteristics of the component.

Figure 5:
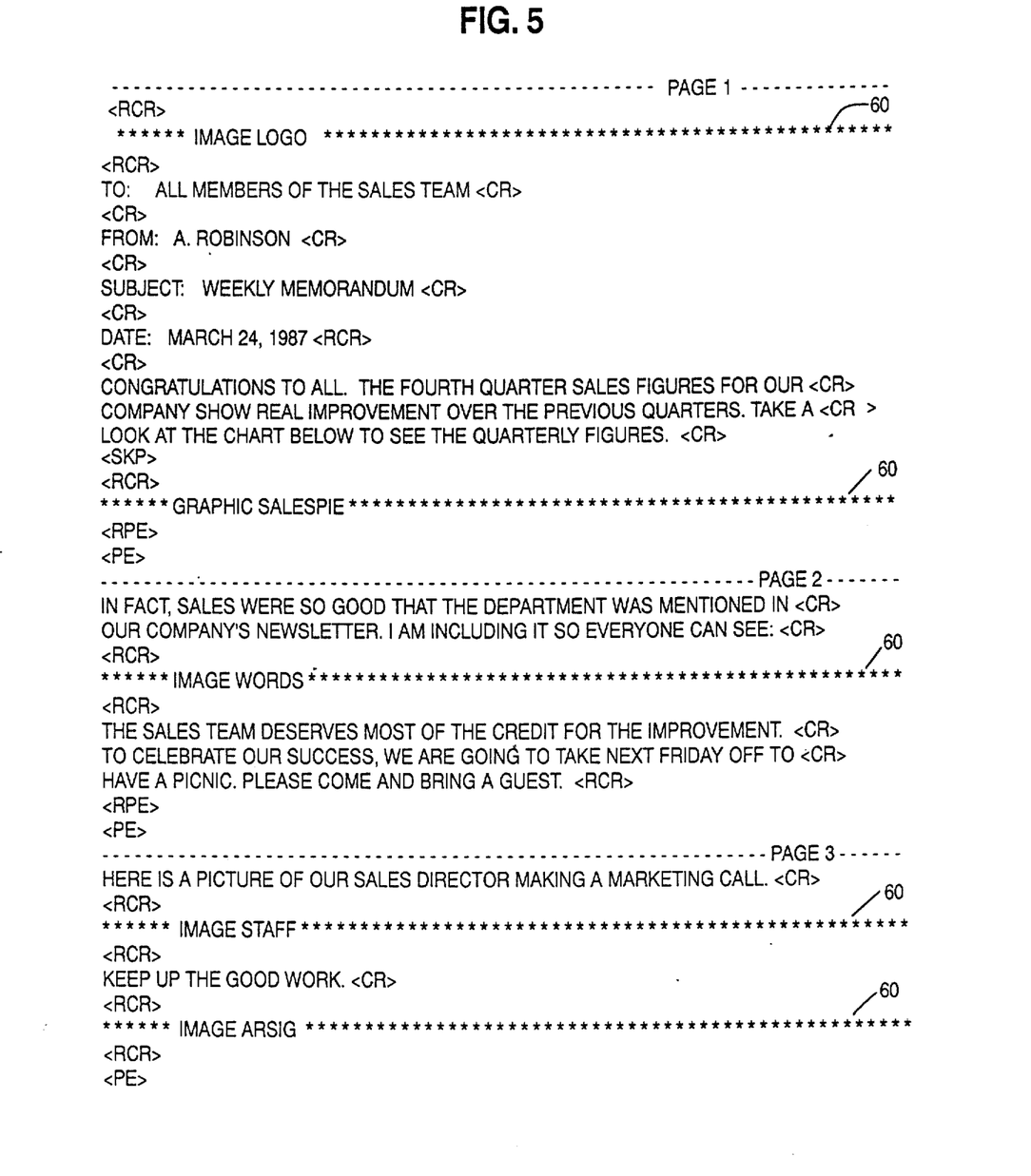
FIG. 5 is a depiction of the appearance of a first document, including the control characters imbedded therein, and showing in particular, the location of image and graphic components to be inserted.

After Index 1 is constructed, the user can exercise a number of options. One option is to display the alphanumeric text of the Document 1 on the alphanumeric display 48. The user has the option of displaying the text alone in WYSIWYG (What You See Is What You Get) form. WYSIWYG form implies that the document displayed to the user is exactly what the document will look like in its ultimate printed form. Alternately, the user can display the control characters, which are embedded in the alphanumeric text, as is depicted in FIG. 5. The characters <RCR>, <CR>, <SKP>, etc., represent the control characters. The control characters show where lines are skipped, new paragraphs made, etc. within the compound document. For example, the characters <CR> stand for carrier return, the characters <SKP> stand for skip lines, the characters <RCR> stand for required carrier return, and so forth. FIG. 5 also illustrates another feature of the invention which is the incorporation of place marker icons which indicate to the user the locations within the alphanumeric text of the referencing controls where the images and vector graphic depictions will be ultimately printed in the final compound document. The icon is a line of asterisks in combination with a file type (image, graphic, audio, etc.), and a file name, i.e., "logo". Alternate ways of depicting the place marker icons are possible. As can be seen in FIG. 5, the "logo" and other non-text components have their places marked where they will appear in the final printed document.

FIG. 5, illustrates yet another facet of the invention. By representing the non-text component by a one-line place marker icon, the drawbacks of the "white-space" prior art method are avoided. In addition, page markers for each page are displayed so that the user knows the placement of the non-text component in the compound document, i.e., what page the non-text component occurs, etc.

Figure 6:
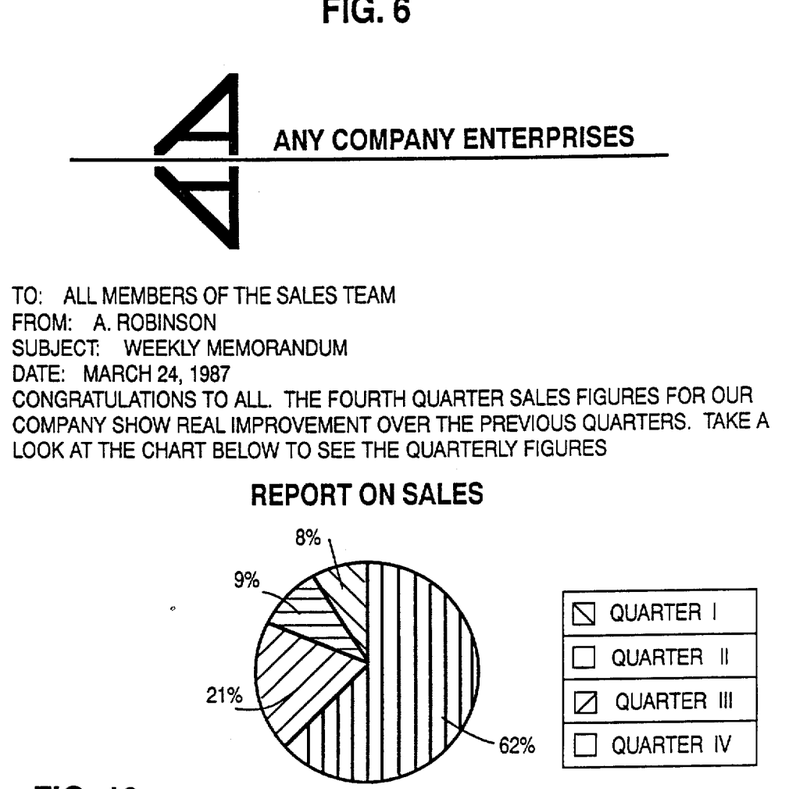
FIGS. 6, 7 and 8 represent pages 1, 2 and 3 of the document depicted in FIG. 5, showing its appearance in final form, which includes the image components and graphic components which are produced in the positions designated by the control characters shown in FIG. 5.
Figure 7:
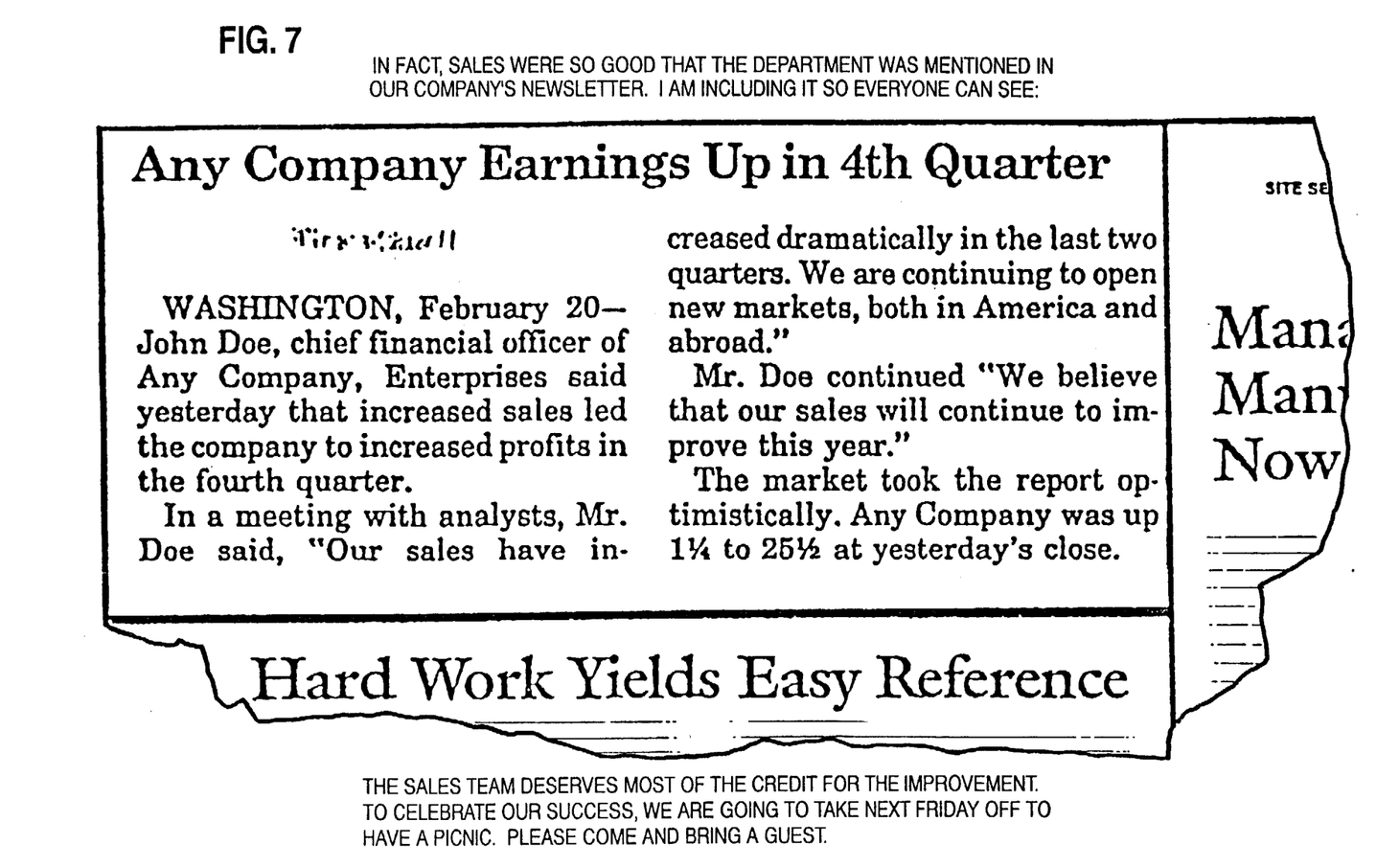
Figure 8:
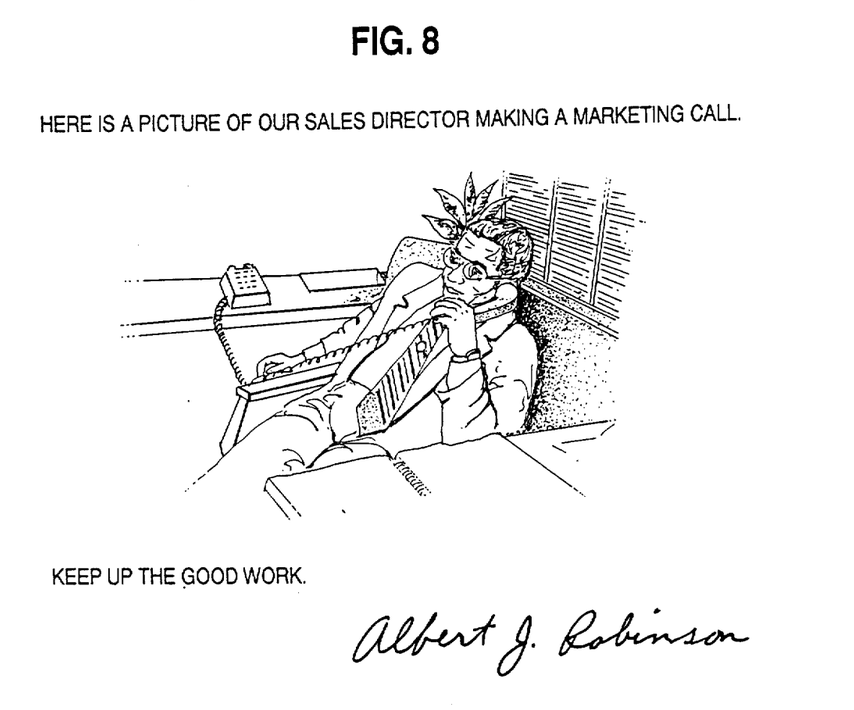

If the user elects to print out the compound document, Document 1, it will appear as is shown in FIGS. 6, 7 and 8, which are the document pages 1, 2 and 3, respectively. As can be seen in FIG. 6, the dot image for the "logo" non-text component is printed at the top of page 1, and reads "Any Company Enterprises" with accompanying graphics as was designated by the user in FIG. 5. This is followed by the alphanumeric text of the first paragraph of page 1, which is then followed by the graphic component "salespie," which occupies the bottom of page 1. FIG. 7 shows page 2 of Document 1, which has the non-text component "words", and FIG. 8 shows page 3, which has the non-text components "staff" and "arsig."

Figure 9:
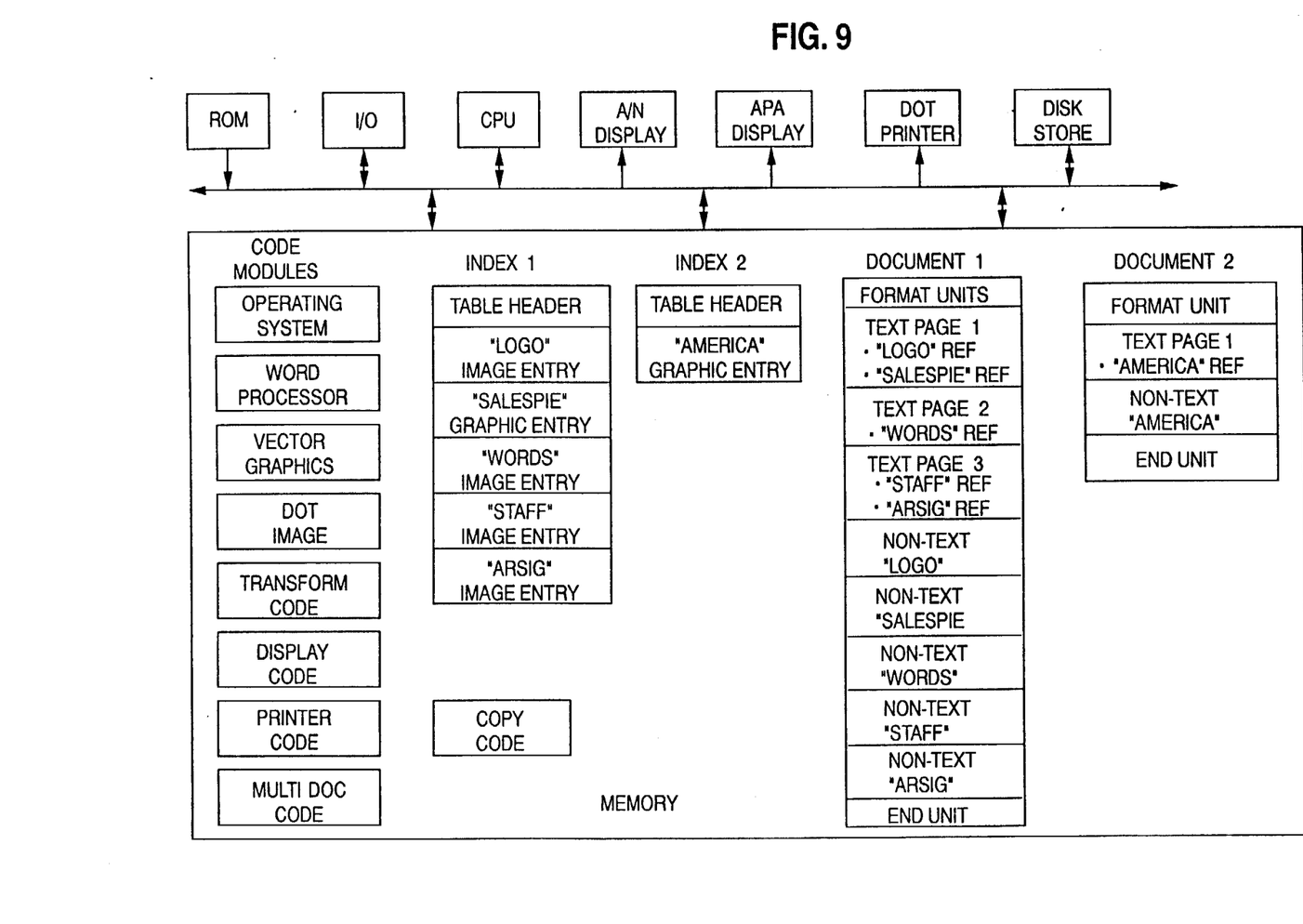
FIG. 9 is an architectural block diagram of the data processor shown in FIG. 1, after a second document has been read into the memory, and a second index table generated for the second document.
Figure 10:
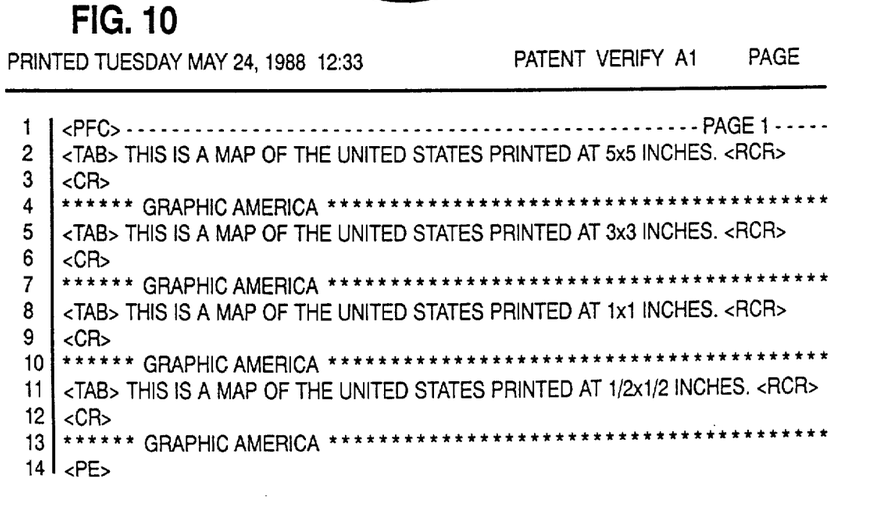
FIG. 10 depicts the appearance of the second document, including the control characters which are imbedded therein.
Figure 11:
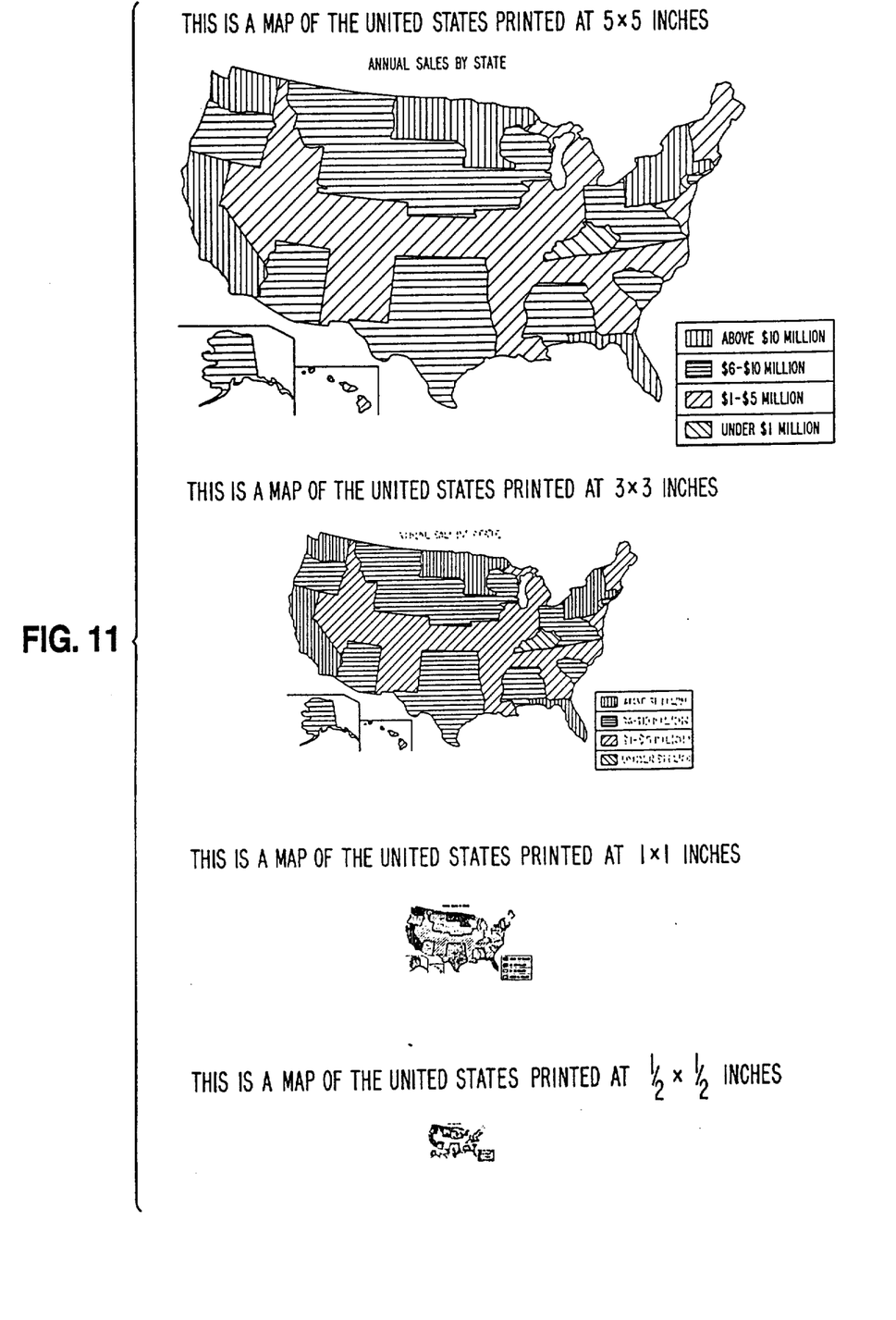
FIG. 11 depicts the appearance of the second document, which includes the arrangement of the graphical components in the locations designated by the control characters shown in FIG. 10.

In an alternate embodiment of the invention, the user can elect to combine the elements of more than one document to generate a modified document. This process is illustrated in several Figures. FIG. 9 shows the data processor wherein a second Document 2 has been read into the memory 24 and a corresponding component index, Index 2, has been generated utilizing the transform code 34, in a manner similar to that for the generation of Index 1. FIG. 10 depicts the alphanumeric elements of Document 2. Also, as shown in FIG. 10, there are four different place marker icons (which display the location of referencing controls) to the same graphic entry "America," which is a graphic shown in FIG. 11. As explained previously, the graphic entry 'America' is stored in a single location in the document database representing Document 2. FIG. 11 illustrates one of the features of the invention which is the ability to make multiple references to the same vector graphic data base, and depict that graphic in several selected sizes. This is performed by a vector graphics program 30, which processes the vector graphic data in the non-text component "America" and by using the user's designation for the elected size, produces from a single non-text component, any one of several sizes as is shown in FIG. 11 for the graphic. Other graphic vector operations such as image reversal or image rotation may be desired by the user.

Figure 12:
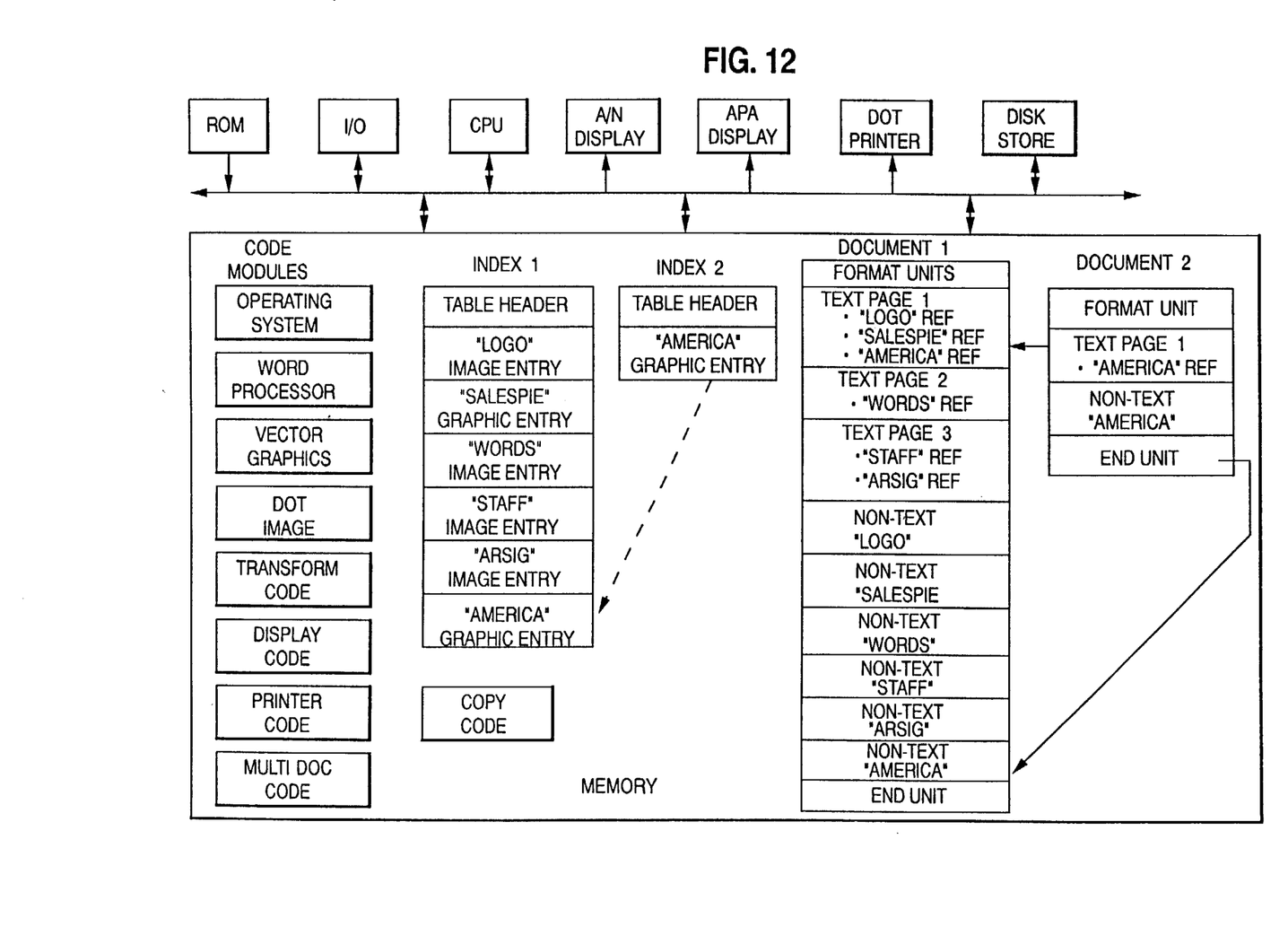
FIG. 12 is an architectural block diagram of the data processor shown in FIG. 1, wherein the operation of copying one of the graphical components from the second document into the first document is illustrated.
Figure 13:
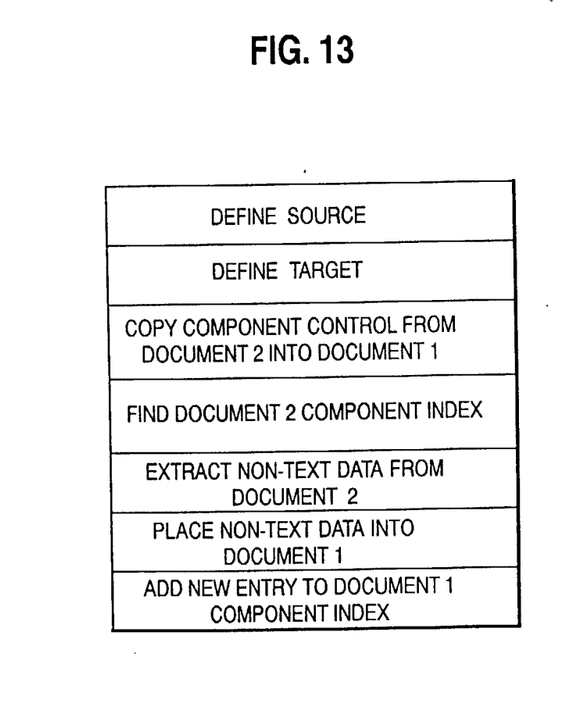
FIG. 13 is a flow diagram of the copying function for carrying out the copying of an image or graphical component from a first document into a second document, as was referred to in FIG. 12.

In this example, the user elects to insert the non-text component "America," from Document 2 onto page 1 of Document 1. The user makes use of the program flow shown in FIG. 13 to perform the copying process depicted in FIG. 12. First, the user copies the referencing control for "America" at the point in the document where he has elected to insert the non-text component, "America". Then the copy code 42 carries out the flow diagram of FIG. 13 by defining the source data in the non-text component "America" as has been designated by the user in Document 2. The program then places a copy reference in Document 1 at the location designated by the user. Referring to FIG. 12, the user has elected to place the reference in the text page 1 of Document 1. The program flow of FIG. 13 then refers to Document 2, index 2, and copies the characteristics for the graphic entry "America," which are applicable to the user's use of that component in Document 1. The component type always remains the same between documents; "America", in this case is a graphic entry. However, the internal starting page number, that is, where in the system pages the data will exist, will be different for Document 1 than it was in Document 2, and this is specified for the graphic entry "America" being created in Index 1. The page count for the number of internal 12 K pages which the data will span will be a function of amount of data associated with the non-text component "America," as it is to be depicted for Document 1. The copy code 42 then copies the data in the non-text component of Document 2 into the Document 1 at the location shown in FIG. 12. This information is entered into the graphic entry "America" for Index 1. The location of the copied non-text component "America" in Document 1 is recorded in the new index entry for "America" in Index 1.

Thus, according to invention, the user has only copied the referencing control for the non-text component "America", both the component control and associated component data are brought into Document 1. The resulting modified Document 1 can then be printed at the election of the user, with the "America" graphic depiction occurring at the designated location on text page 1 of modified Document 1.

Figure 14:
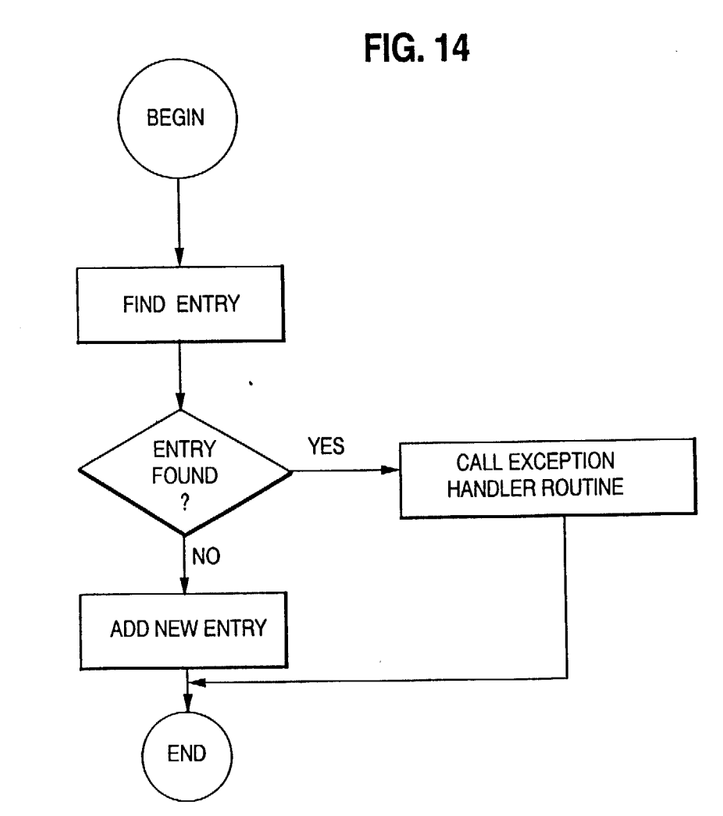
FIG. 14 is a flow diagram of the operation of adding an entry to an index table.

The operation of adding an entry to an index table is shown in the flow diagram of FIG. 14. FIG. 14 begins where the transform code 34 has found a non-text component in a compound document. The transform code 34 searches the component index associated with the document for an index entry corresponding to the non-text component found. If no index entry is found for the non-text component, the transform code 34 adds a new index entry in the component index. If an index entry is found, the exception handler routine is called up. Under the exception handler, the preferred disposition of the non-text component is simply to disallow the entry of a like named non-text component. Optionally, the exception handler could replace the old non-text component with the new non-text component, prompt the user to rename the new non-text component and then add a new index entry to the component index, etc.

A printing operation is carried out according to the invention as is shown in the flow diagram of FIG. 15. The program inputs the document such as the Document 1 and looks for non-text components. When a non-text component is found, the program extracts the non-text data and places it in the output stream with the appropriate size as has been designated by the user. Program repeats the operation of looking for additional non-text components, printing them along with the alphanumeric text as has been ordered by the Document 1. The final compound document will contain both the alphanumeric text, the vector graphics and the dot images, as has been designated by the user in the document.

Figure 16:
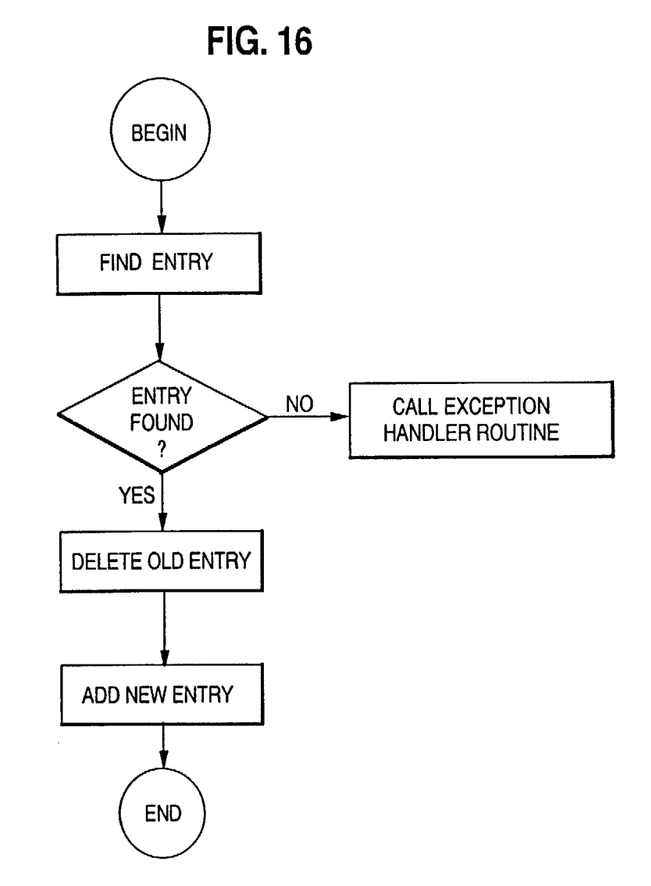
FIG. 16 is a flow diagram of an operation to rename an index entry in an index table.
Figure 17:
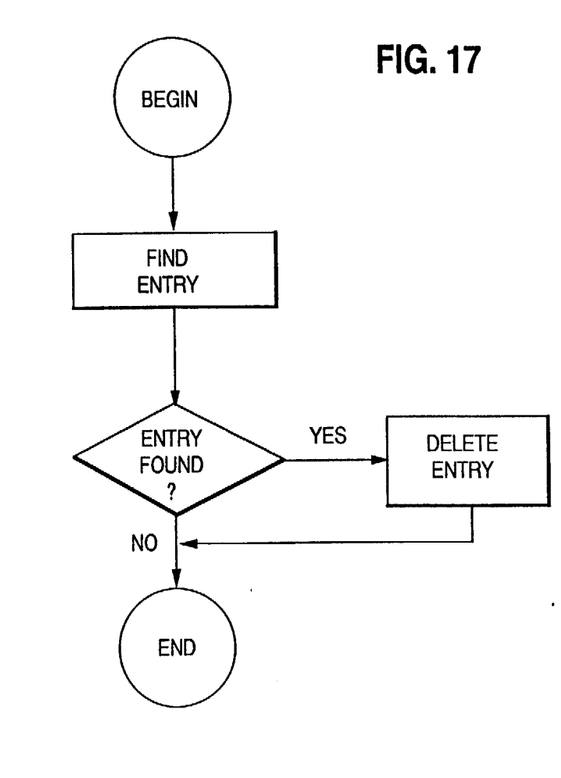
FIG. 17 is a flow diagram of the operation to delete an entry in an index table.

Other operations which the user can perform include renaming an entry in an index table as is shown in FIG. 16, or alternately deleting an entry from the index table as shown in FIG. 17.

Although a specific embodiment of the invention has been disclosed, it will be understood by those having skill in the art that changes can be made to that specific embodiment without departing from the spirit and the scope of the invention.

What is claimed is:

1. In a data processing system, including a central processing unit, a random access memory, and a bulk storage device, and further including a display device and a dot printer, all interconnected by a system bus, a method for constructing a first compound document carried out by said central processing unit operating upon sets of instructions stored in said random access memory, said compound document including both alphanumeric text and a non-text component, the method comprising the steps of:

organizing a first database representation of said first compound document to include an alphanumeric text portion, and a non-text component;

reading said first document database into said random access memory from said system bus;

transforming said first document database into an internal editing format, said format containing said non-text component in a single location;

constructing a first component index which includes an index entry associated with said non-text component of said first document database said index entry in said component index having a set of control parameters which include an indication of a component type, a component name, and said location of said non-text component in said random access memory;

placing a referencing control in said alphanumeric text where said non-text component is to be printed in said compound document;

whereby a compound document containing both alphanumeric text and non-text components is generated.

2. The method of claim 1, which further comprises the step of:

displaying a representation of said document database on an alphanumeric display which includes a place marker icon corresponding to said non-text component positioned in said document to indicate where said non-text component is to be printed in said document.

3. The method of claim 2, which further comprises the step of:

displaying a page marker for each page so that the placement of said non-text component in said compound document is evident to a user.

4. The method of claim 1, which further comprises the step of:

printing said document on said dot printer by referring to said document database and positioning the alphanumeric text where indicated and positioning said non-text component where indicated in said document database.

5. The method of claim 1, which further comprises the step of:

displaying said non-text component on a display device capable of displaying said non-text component.

6. The method of claim 1, which further comprises the step of:

displaying a menu associated with said component index which includes the control parameters listed for said non-text component.

7. The method of claim 1, which further comprises the steps of:

changing the control parameters for said non-text component;

updating said component control to reflect said changes in the control parameters.

8. The method of claim 1, wherein said database representation of compound documents includes a multiple of referencing controls to said non-text component in said alphanumeric text and a single physical representation of said non-text component, whereby said non-text component is included a multiple of times in said compound document.

9. The method of claim 1, which further comprises the step of:

operating on said non-text component with a vector graphics program stored in said random access memory in a vector graphic operation to be performed in accordance with information entered at said referencing control.

10. The method of claim 1, wherein said non-text component is a dot-image depiction.

11. The method of claim 1, wherein:

said non-text component is a vector graphics depiction.

12. The method of claim 1, wherein:

said non-text component is a digital-audio representation.

13. The method of claim 1, which further comprises the step of combining the non-text components of said first compound document and a second compound document said combining step comprising the steps of:

reading a second document database representing said second compound document into said random access memory from said system bus, transforming said second document database into internal editing format and generating a second component index associated therewith;

defining a source non-text component in said second component document;

defining a target reference location for said source non-text component in said first compound document where said source non-text component will appear in said first compound document;

placing a referencing control in said first document database for said non-text document at a position desired for ultimate insertion of said non-text component;

referring to said second component index to determine where said source non-text component is in said second document database;

extracting said source non-text component from said second document database and copying said non-text component into said first document database;

adding an entry to said first component index containing a component type for said source non-text component, a location in said random access memory for said source non-text component in said first document database;

whereby a portion of said second document database has been incorporated into said first document database to produce a modified compound document.

14. The method of claim 13, wherein the only action performed by the user is placing said referencing control in said first document by copying said referencing control from said second document into said first document.

15. In a data processing system including a CPU unit, a memory, a bulk storage and a workstation all interconnected by a system bus, said workstation including a keyboard for inputting command and working text information to said data processing system and a display screen, an improved method of transforming a compound document data stream that produces a dynamic compound index of non-text components within a sequentially ordered component document data stream where each non-text component is contained in a single location, said improved method carried out by said CPU operating upon sets of instructions stored in said memory in response to user actions and comprising the steps of:

scanning said sequentially ordered compound document data stream for non-text components;

extracting non-text component characteristics for each said non-text component from said sequentially ordered compound document data stream;

creating a component index in said sequentially ordered document datastream, said component index having index entries for each said non-text component, each said index entry including a listing of component type, component name and component location in said memory for each said non-text component;

and updating said component index in said sequentially ordered component document datastream.

16. The method of claim 15 which further comprises the step of displaying said sequentially ordered document datastream as a compound document which includes alphanumeric text and non-text component on said display screen.

17. A text processing system for constructing a compound document which includes both alphanumeric text and a non-text component comprising:

a random access memory connected to a system bus;

means to organize a database representation of said compound document resident in said random access memory, said compound document to include an alphanumeric text portion and a non-text component;

means to construct a component index resident in said random access memory, said component index including an index entry associated with said non-text component of said document database;

means to place a referencing control in said alphanumeric text resident in said random access memory;

a central processing unit connected to said system bus where said central processing unit operates on said means resident in said random access memory to organize said database representation of said compound document containing said component index and said referencing control; and, a display device connected to said system bus, said display device for displaying a representation of said document database as an alphanumeric display which includes a place marker icon corresponding to said non-text component positioned in said document to indicate an intended location of said non-text component in said document.

18. The text processing system of claim 17 which further comprises:

a dot printer for printing said compound document by referring to said document database and positioning the alphanumeric text where indicated and positioning said non-text where indicated in said document database.

* * * * *